(12) United States Patent
Nakadai et al.

(10) Patent No.: US 8,538,751 B2
(45) Date of Patent: Sep. 17, 2013

(54) SPEECH RECOGNITION SYSTEM AND SPEECH RECOGNIZING METHOD

(75) Inventors: Kazuhiro Nakadai, Wako (JP); Gokhan Ince, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 284 days.

(21) Appl. No.: 13/157,648

(22) Filed: Jun. 10, 2011

(65) Prior Publication Data

US 2012/0095761 A1  Apr. 19, 2012

(30) Foreign Application Priority Data

Oct. 15, 2010   (JP) ................................ 2010-232817

(51) Int. Cl.
*G10L 15/20* (2006.01)
*G10L 19/14* (2006.01)

(52) U.S. Cl.
USPC ........................... 704/233; 704/234; 704/236

(58) Field of Classification Search
None
See application file for complete search history.

(56) References Cited

U.S. PATENT DOCUMENTS

| | | | | |
|---|---|---|---|---|
| 6,993,483 | B1 * | 1/2006 | Milner ......................... | 704/236 |
| 8,019,089 | B2 * | 9/2011 | Seltzer et al. ................ | 381/71.1 |
| 8,073,690 | B2 * | 12/2011 | Nakadai et al. .............. | 704/233 |
| 8,392,185 | B2 * | 3/2013 | Nakadai et al. .............. | 704/233 |
| 2008/0071540 | A1 * | 3/2008 | Nakano et al. ............... | 704/251 |

OTHER PUBLICATIONS

Nakadai, K.; Yamamoto, S.; Okuno, H.G.; Nakajima, H.; Hasegawa, Y.; Tsujino, H., "A robot referee for rock-paper-scissors sound games," Robotics and Automation, 2008. ICRA 2008. IEEE International Conference on , vol., no., pp. 3469,3474, May 19-23, 2008.*
Yamamoto, S.; Nakadai, K.; Nakano, M.; Tsujino, H.; Valin, J.-M.; Komatani, K.; Ogata, T.; Okuno, H.G., "Design and implementation of a robot audition system for automatic speech recognition of simultaneous speech," Automatic Speech Recognition & Understanding, 2007. ASRU. IEEE Workshop on , vol., no., pp. 111,116, Dec. 9-13, 2007.*
Nishimura, Y.; Ishizuka, M.; Nakadai, K.; Nakano, M.; Tsujino, H., "Speech Recognition for a Humanoid with Motor Noise Utilizing Missing Feature Theory," Humanoid Robots, 2006 6th IEEE-RAS International Conference on , vol., no., pp. 26,33, Dec. 4-6, 2006.*
Yamamoto, S.; Nakadai, K.; Tsujino, H.; Yokoyama, T.; Okuno, H.G., "Improvement of robot audition by interfacing sound source separation and automatic speech recognition with Missing Feature Theory," Robotics and Automation, 2004. Proceedings. ICRA '04. 2004 IEEE International Conference on , vol. 2, no., pp. 1517,1523 vol. 2, Apr. 26-May 1, 2004.*

(Continued)

*Primary Examiner* — Brian Albertalli
(74) *Attorney, Agent, or Firm* — Squire Sanders (US) LLP

(57) ABSTRACT

A speech recognition system and a speech recognizing method for high-accuracy speech recognition in the environment with ego noise are provided. A speech recognition system according to the present invention includes a sound source separating and speech enhancing section; an ego noise predicting section; and a missing feature mask generating section for generating missing feature masks using outputs of the sound source separating and speech enhancing section and the ego noise predicting section; an acoustic feature extracting section for extracting an acoustic feature of each sound source using an output for said each sound source of the sound source separating and speech enhancing section; and a speech recognizing section for performing speech recognition using outputs of the acoustic feature extracting section and the missing feature masks.

8 Claims, 8 Drawing Sheets

(56) References Cited

OTHER PUBLICATIONS

Steven F. Boll, "Suppression of Acoustic Noise in Speech Using Spectral Subtraction", IEEE transactions on Acoustics, Speech and Signal Processing, vol. ASSP-27, No. 2, Apr. 1979, pp. 113-120.

A. Ito et al., "Internal Noise Suppression for Speech Recognition by Small Robots", Interspeech 2005, pp. 2685-2688.

I Cohen et al., "Noise Estimation by Minima Controlled Recursive Averaging for Robust Speech Enhancement", IEEE Signal Processing Letters, vol. 9, No. 1, Jan. 2002, pp. 12-15.

Kazuhiro Nakadai et al., "Sound Source Separation of Moving Speakers for Robot Audition", Proc. IEEE International Conference on Acoustics, Speech and Signal Processing (ICASSP), 2009, pp. 3685-3688.

Shun'Ichi Yamamoto et al., "Enhanced Robot Speech Recognition Based on Microphone Array Source Separation and Missing Feature Theory" IEEE/RSJ International conference on Robotics and Automation (ICRA), 2005, pp. 1-6.

Shun'Ichi Yamamoto et al., "Real-Time Robot Audition System That Recognizes Simultaneous Speech in the Real World", Proc. of the IEEE/RSJ International Conference on Robots and Intelligent Systems (IROS), 2006, pp. 5333-5338.

Jean-Marc Valin et al., "Enhanced Robot Audition Based on Microphone Array Source Separation with Post-Filter", Proc. of the IEEE/RSJ International Conference on Intelligent Robots and Systems (IROS), 2004, pp. 2123-2128.

Israel Cohen et al., "Microphone Array Post-Filtering for Non-Stationary Noise Suppression", Proc. IEEE International Conference on Acoustics, Speech and Signal Processing (ICASSP), 2002, pp. 901-904.

Bhiksha Raj et al., "Missing-Feature Approaches in Speech Recognition", IEEE Signal Processing Magazine, vol. 22, 2005, pp. 101-116.

\* cited by examiner

FIG. 3

| OPERATIONAL STATE (FEATURE VECTOR) | ACOUSTIC DATA (FREQUENCY SPECTRUM) |
|---|---|
| $\theta j(1), \dot{\theta}j(1), \ddot{\theta}j(1)$ | $D(1,1), D(2,1) \cdots D(F,1)$ |
| $\vdots$ | $\vdots$ |
| $\theta j(k), \dot{\theta}j(k), \ddot{\theta}j(k)$ | $D(1,k), D(2,k) \cdots D(F,k)$ |
| $\vdots$ | $\vdots$ |

SPEECH RECOGNITION SYSTEM AND SPEECH RECOGNIZING METHOD

BACKGROUND OF THE INVENTION

1. Field of the Invention

The present invention relates to a speech recognition system and a speech recognizing method.

2. Background Art

When a robot functions while communicating with persons, for example, it has to perform speech recognition of speeches of the persons while executing motions. When the robot executes motions, so called ego noise (ego-motion noise) caused by robot motors or the like are generated. Accordingly, the robot has to perform speech recognition in the environment with ego noise being generated.

Several methods in which templates stored in advance are subtracted from spectra of obtained sounds have been proposed to reduce ego noise (S. Boll, "Suppression of Acoustic Noise in Speech Using Spectral Subtraction", IEEE Transactions on Acoustics, Speech, and Signal Processing, vol. ASSP-27, No. 2, 1979, and A. Ito, T. Kanayama, M. Suzuki, S. Makino, "Internal Noise Suppression for Speech Recognition by Small Robots", Interspeech 2005, pp. 2685-2688, 2005.). These methods are single-channel based noise reduction methods. Single-channel based noise reduction methods generally degrade the intelligibility and quality of the audio signal, for example, through the distorting effects of musical noise, a phenomenon that occurs when noise estimation fails (I. Cohen, "Noise Estimation by Minima Controlled Recursive Averaging for Robust Speech Enhancement", IEEE Signal Processing Letters, vol. 9, No. 1, 2002).

On the other hand, linear sound source separation (SSS) techniques are also very popular in the field of robot audition, where noise suppression is mostly carried out using SSS techniques with microphone arrays (K. Nakadai, H. Nakajima, Y. Hasegawa and H. Tsujino, "Sound source separation of moving speakers for robot audition", Proc. IEEE International Conference on Acoustics, Speech and Signal Processing (ICASSP), pp. 3685-3688, 2009, and S. Yamamoto, J. M. Valin, K Nakadai, J. Rouat, F. Michaud, T. Ogata, and H. G. Okuno, "Enhanced Robot Speech Recognition Based on Microphone Array Source Separation and Missing Feature Theory", IEEE/RSJ International Conference on Robotics and Automation (ICRA), 2005). However, a directional noise model such as assumed in case of interfering speakers (S. Yamamoto, K Nakadai, M. Nakano, H. Tsujino, J. M. Valin, K. Komatani, T. Ogata, and H. G. Okuno, "Real-time robot audition system that recognizes simultaneous speech in the real world", Proc. of the IEEE/RSJ International Conference on Robots and Intelligent Systems (IROS), 2006.) or a diffuse background noise model (J. M. Valin, J. Rouat and F. Michaud, "Enhanced Robot Audition Based on Microphone Array Source Separation with Post-Filter", Proc. IEEE/RSJ International Conference on Intelligent Robots and Systems (IROS), pp. 2123-2128, 2004.) does not hold entirely for the ego-motion noise. Especially because the motors are located in the near field of the microphones, they produce sounds that have both diffuse and directional characteristics.

Thus, conventionally a speech recognition system and a speech recognizing method for high-accuracy speech recognition in the environment under ego noise have not been developed.

Accordingly, there is a need for a speech recognition system and a speech recognizing method for high-accuracy speech recognition in the environment under ego noise.

SUMMARY OF THE INVENTION

A speech recognition system according to a first aspect of the present invention includes a sound source separating and speech enhancing section; an ego noise predicting section; and a missing feature mask generating section for generating missing feature masks using outputs of the sound source separating and speech enhancing section and the ego noise predicting section; an acoustic feature extracting section for extracting an acoustic feature of each sound source using an output for said each sound source of the sound source separating and speech enhancing section; and a speech recognizing section for performing speech recognition using outputs of the acoustic feature extracting section and the missing feature masks.

In the speech recognition system according to the present aspect, the missing feature mask generating section generates missing feature masks using the outputs of the sound source separating and speech enhancing section and the ego noise predicting section. Accordingly, input data of the speech recognizing section can be adjusted based on the results of sound separation and the predicted ego noise to improve speech recognition accuracy.

A speech recognition system according to a second aspect of the present invention includes a sound source separating and speech enhancing section; an ego noise predicting section; a speaker missing feature mask generating section for generating speaker missing feature masks for each sound source using an output for said each sound source of the sound source separating and speech enhancing section; and an ego noise missing feature mask generating section for generating ego noise missing feature masks for each sound source using an output for said each sound source of the sound source separating and speech enhancing section and an output of the ego noise predicting section. The speech recognition system according to the present aspect further includes a missing feature mask integrating section for integrating speaker missing feature masks and ego noise missing feature masks to generate total missing feature masks; an acoustic feature extracting section for extracting an acoustic feature of each sound source using an output for said each sound source of the sound source separating and speech enhancing section; and a speech recognizing section for performing speech recognition using outputs of the acoustic feature extracting section and the total missing feature masks.

The speech recognition system according to the present aspect is provided with the missing feature mask integrating section for integrating speaker missing feature masks and ego noise missing feature masks to generate total missing feature masks. Accordingly, appropriate total missing feature masks can be generated for each individual environment, using the outputs of the sound source separating and speech enhancing section and the output of the ego noise predicting section to improve speech recognition accuracy.

In a speech recognition system according to a first embodiment of the second aspect of the present invention, the ego noise missing feature mask generating section generates the ego noise missing feature masks for each sound source using a ratio between a value obtained by dividing the output of the ego noise predicting section by the number of the sound sources and an output for said each sound source of the sound source separating and speech enhancing section.

In the speech recognition system according to the present embodiment, reliability for ego noise of an output for each sound source of the sound source separating and speech enhancing section is determined using a ratio between a value obtained by dividing energy of the ego noise by the number of the sound sources and energy of sound for each sound source. Accordingly, a portion of the output which is contaminated by the ego noise can be effectively removed to improve speech recognition accuracy.

In a speech recognition system according to a second embodiment of the second aspect of the present invention, the missing feature mask integrating section adopts a speaker missing feature mask as a total missing feature mask for each sound source when an output for said each sound source of the sound source separating and speech enhancing section is equal to or greater than a value obtained by dividing the output of the ego noise predicting section by the number of the sound sources and adopts an ego noise missing feature mask as the total missing feature mask for said each sound source when the output for said each sound source of the sound source separating and speech enhancing section is smaller than the value obtained by dividing the output of the ego noise predicting section by the number of the sound sources.

In the speech recognition system according to the present embodiment, an appropriate total missing feature mask can be generated depending on energy of sounds from the sound sources and energy of the ego noise and speech recognition accuracy can be improved by using the total missing feature mask.

A speech recognizing method according to a third aspect of the present invention includes the steps of separating sound sources by a sound source separating and speech enhancing section; predicting ego noise by an ego noise predicting section; generating missing feature masks using outputs of the sound source separating and speech enhancing section and an output of the ego noise predicting section, by a missing feature mask generating section; extracting an acoustic feature of each sound source using an output for said each sound source of the sound source separating and speech enhancing section, by an acoustic feature extracting section; and performing speech recognition using outputs of the acoustic feature extracting section and the missing feature masks, by a speech recognizing section.

In the speech recognizing method according to the present aspect, the missing feature mask generating section generates missing feature masks using the outputs of the sound source separating and speech enhancing section and the output of the ego noise predicting section. Accordingly, input data of the speech recognizing section can be adjusted based on the results of sound separation and the predicted ego noise to improve speech recognition accuracy.

A speech recognizing method according to a fourth aspect of the present invention includes the steps of separating sound sources by a sound source separating and speech enhancing section; predicting ego noise by an ego noise predicting section; generating speaker missing feature masks for each sound source using an output for said each sound source of the sound source separating and speech enhancing section, by a speaker missing feature mask generating section; and generating ego noise missing feature masks for each sound source using an output for said each sound source of the sound source separating and speech enhancing section and an output of the ego noise predicting section, by an ego noise missing feature mask generating section. The speech recognizing method according to the present aspect further includes the steps of integrating speaker missing feature masks and ego noise missing feature masks to generate total missing feature masks, by a missing feature mask integrating section; extracting an acoustic feature of each sound source using an output for said each sound source of the sound source separating and speech enhancing section, by an acoustic feature extracting section; and performing speech recognition using outputs of the acoustic feature extracting section and the total missing feature masks, by a speech recognizing section.

In the speech recognizing method according to the present aspect, appropriate total missing feature masks can be generated by the missing feature mask integrating section for each individual environment, using the outputs of the sound source separating and speech enhancing section and the output of the ego noise predicting section to improve speech recognition accuracy.

In a speech recognizing method according to a first embodiment of the fourth aspect of the present invention, in the step of generating ego noise missing feature masks, the ego noise missing feature masks for each sound source are generated using a ratio between a value obtained by dividing the output of the ego noise predicting section by the number of the sound sources and an output for said each sound source of the sound source separating and speech enhancing section.

In the speech recognizing method according to the present embodiment, reliability for ego noise of an output for each sound source of the sound source separating and speech enhancing section is determined a ratio between a value obtained by dividing energy of the ego noise by the number of the sound sources and energy of sound for each sound source. Accordingly, a portion of the output which is contaminated by the ego noise can be effectively removed to improve speech recognition accuracy.

In a speech recognizing method according to a second embodiment of the fourth aspect of the present invention, in the step of integrating speaker missing feature masks and ego noise missing feature masks to generate total missing feature masks, a speaker missing feature mask is adopted as a total missing feature mask for each sound source when an output for said each sound source of the sound source separating and speech enhancing section is equal to or greater than a value obtained by dividing the output of the ego noise predicting section by the number of the sound sources and an ego noise missing feature mask is adopted as the total missing feature mask for said each sound source when the output for said each sound source of the sound source separating and speech enhancing section is smaller than the value obtained by dividing the output of the ego noise predicting section by the number of the sound sources.

In the speech recognizing method according to the present embodiment, an appropriate total missing feature mask can be generated depending on energy of sounds from the sound sources and energy of the ego noise and speech recognition accuracy can be improved by using the total missing feature mask.

BRIEF DESCRIPTION OF THE DRAWINGS

FIG. 3 shows a structure of the template database;

DETAILED DESCRIPTION OF THE INVENTION

Figure 1:
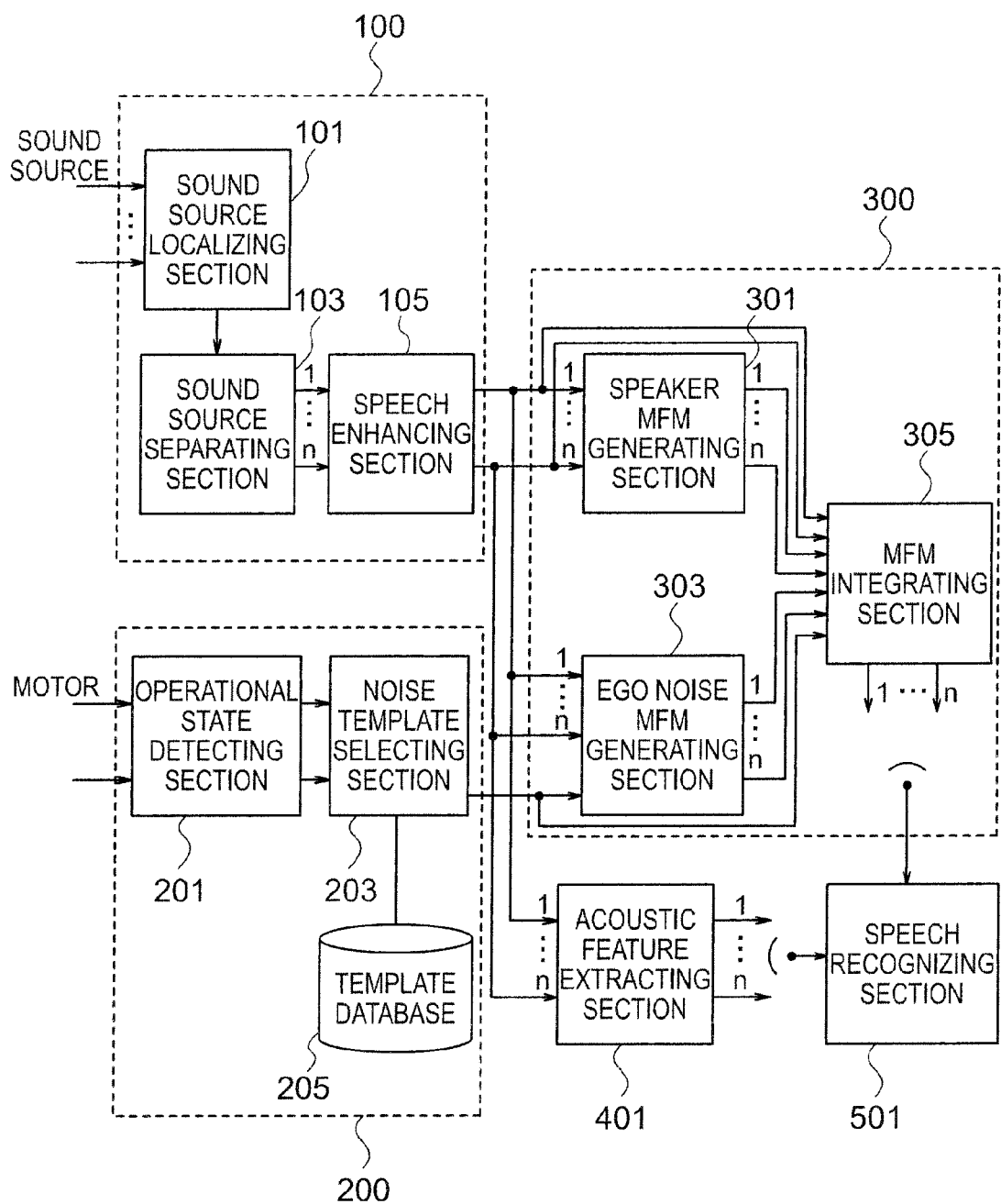
FIG. 1 illustrates a configuration of a speech recognition system according to an embodiment of the present invention.

FIG. 1 illustrates a configuration of a speech recognition system according to an embodiment of the present invention. The speech recognition system includes a sound source separating and speech enhancing section 100, an ego noise predicting section 200, a missing feature mask generating section 300, an acoustic feature extracting section 401 and a speech recognizing section 501.

Figure 2:
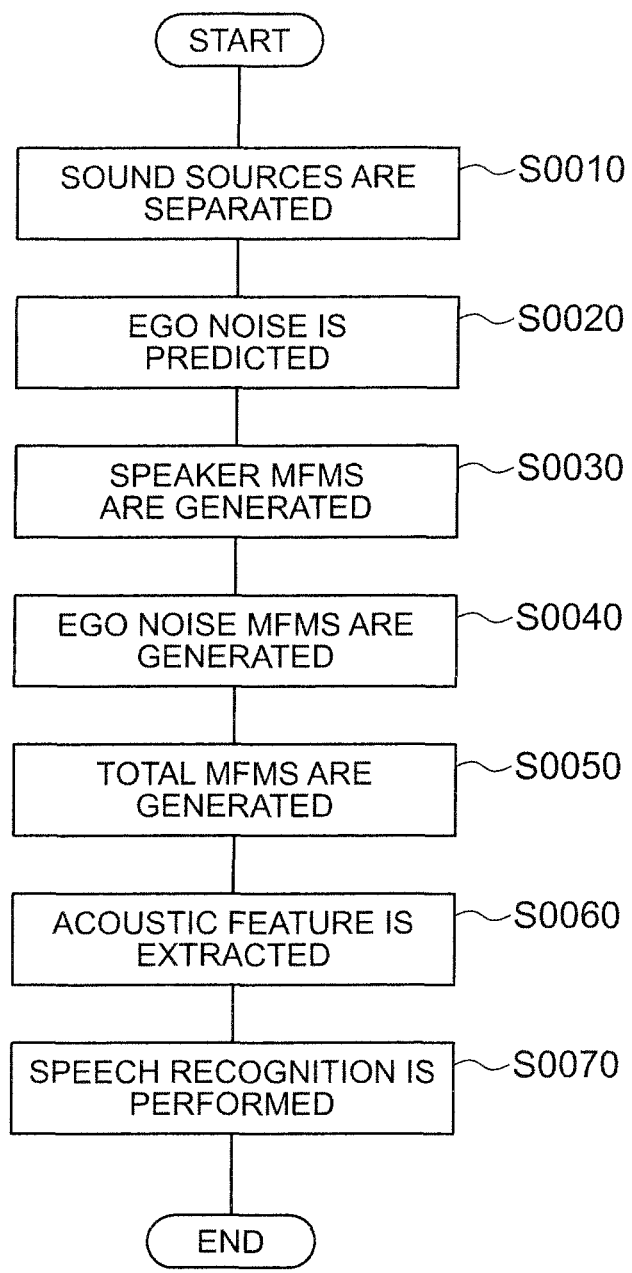
FIG. 2 is a flowchart showing a speech recognizing method according to an embodiment of the present invention.

FIG. 2 is a flowchart showing a speech recognizing method according to an embodiment of the present invention. Explanation of FIG. 2 will be given after the respective sections of the speech recognition system have been described.

The sound source separating and speech enhancing section 100 includes a sound source localizing section 101, a sound source separating section 103 and a speech enhancing section 105. The sound source localizing section 101 localizes sound sources using acoustic data obtained from a plurality of microphones set on a robot. The sound source separating section 103 separates the sound sources using localized positions of the sound sources. The sound source separating section 103 uses a linear separating algorithm called Geometric Source Separation (GSS) (S. Yamamoto, K Nakadai, M. Nakano, H. Tsujino, J. M. Valin, K Komatani, T. Ogata, and H. G. Okuno, "Real-time robot audition system that recognizes simultaneous speech in the real world", Proc. of the IEEE/RSJ International Conference on Robots and Intelligent Systems (IROS), 2006.). As shown in FIG. 1, the sound source separating section 103 has n outputs. N represents the number of sound sources, that is speakers. In the missing feature mask generating section 300, the acoustic feature extracting section 401 and the speech recognizing section 501, operation is performed for each individual sound source as described later. The speech enhancing section 105 performs multi-channel post-filtering Cohen and B. Berdugo, "Microphone array post-filtering for non-stationary noise suppression", Proc. IEEE International Conference on Acoustics, Speech and Signal Processing (ICASSP), pp. 901-904, 2002.). The multichannel post-filtering attenuates stationary noise, e.g. background noise, and non-stationary noise that arises because of the leakage energy between the output channels of the previous separation stage for each individual sound source. The sound source separating and speech enhancing section 100 can be implemented by any other multi-channel arrangement that can separate sound sources having directivities.

The ego noise predicting section 200 detects operational states of motors used in the robot and estimates ego noise based on the operational states. The configuration and function of the ego noise predicting section 200 will be described in detail later.

The missing feature mask generating section 300 generates missing feature masks which are appropriate for each individual speaker (sound source) in the environment, based on outputs of the sound source separating and speech enhancing section 100 and the ego noise predicting section 200. The configuration and function of the missing feature mask generating section 300 will be described in detail later.

The acoustic feature extracting section 401 extracts an acoustic feature for each individual speaker (sound source) from those obtained by the sound source separating and speech enhancing section 100.

The speech recognizing section 501 performs speech recognition using the acoustic feature for each individual speaker (sound source) obtained by the acoustic feature extracting section 401 and missing feature masks for each individual speaker (sound source) obtained by the missing feature mask generating section 300.

The ego noise predicting section 200 will be described below. The ego noise predicting section 200 includes an operational state detecting section 201 which detects operational states of motors used in the robot, a template database 205 which stores noise templates corresponding to respective operational states and a noise template selecting section 203 which selects the noise template corresponding to the operational state which is the closest to the current operational state detected by the operational state detecting section 201. The noise template selected by the noise template selecting section 203 corresponds to an estimated noise.

FIG. 3 shows a structure of the template database 205.

Figure 4:
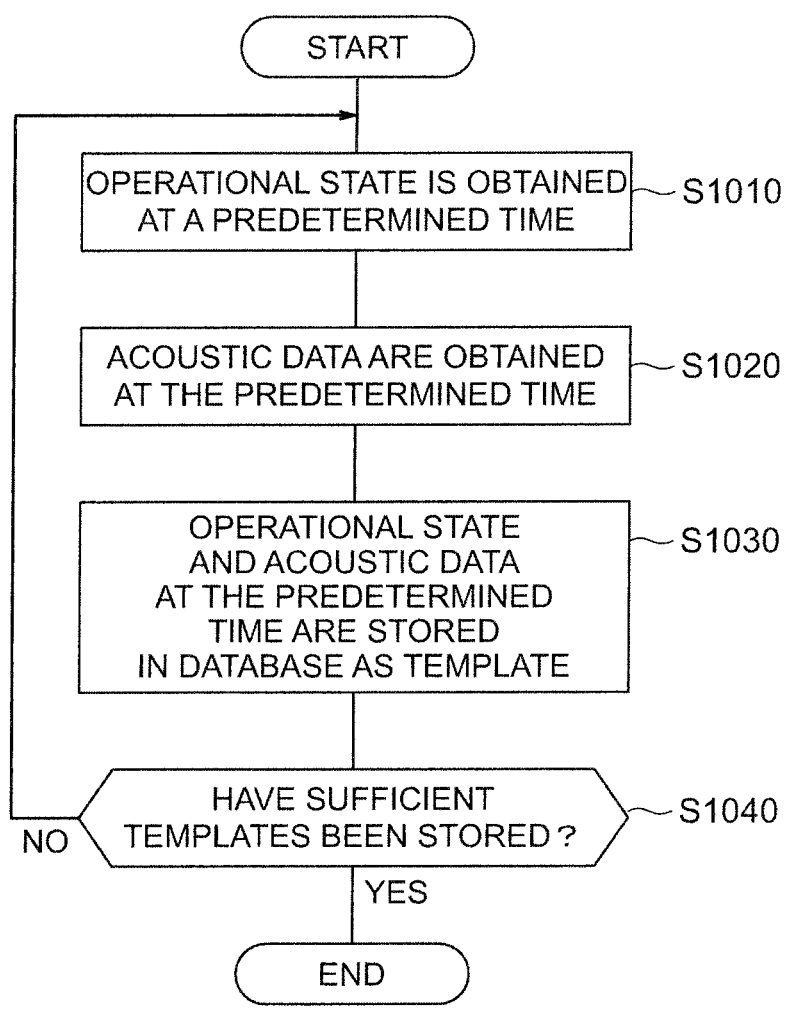
FIG. 4 is a flowchart showing a process in which the template database is generated.

FIG. 4 is a flowchart showing a process in which the template database 205 is generated.

In generating the template database 205, while the robot performs a sequence of motions and pauses of less than one second which are set between consecutive motions, the operational state detecting section 201 detects operational states, and acoustic data are obtained.

In step S1010 of FIG. 4, the operational state detecting section 201 obtains an operational state of the robot at a predetermined time.

An operational state of the robot is represented by an angle $\theta$, an angular velocity $\dot{\theta}$, and an angular acceleration $\ddot{\theta}$ of each joint motor of the robot. Assuming that the number of the joints of the robot is J, a feature vector representing an operational state is as below.

$$[\theta_1(k),\dot{\theta}_1(k),\ddot{\theta}_1(k),\ldots,\theta_J(k),\dot{\theta}_J(k),\ddot{\theta}_J(k)]$$

Parameter k represents time. Values of an angle $\theta$, an angular velocity $\dot{\theta}$, and an angular acceleration $\ddot{\theta}$ are obtained at the predetermined time and normalized to the range of [−1.1].

In step S1020 of FIG. 4, acoustic data are obtained at the predetermined time. More specifically, acoustic data corresponding to the above-described operational state of the robot, that is, acoustic data corresponding to motor noise are obtained and represented by the following frequency spectrum.

$$[D(1,k),D(2,k),\ldots,D(F,k)]$$

Parameter k represents time while parameter F represents a frequency range. The frequency ranges are obtained by dividing a range from 0 kHz to 8 kHz into 256 segments. The acoustic data are obtained at the predetermined time.

In step S1030 of FIG. 4, a feature vector representing an operational state which has been obtained by the operational state detecting section 201

$$[\theta_1(k),\dot{\theta}_1(k),\ddot{\theta}_1(k),\ldots,\theta_J(k),\dot{\theta}_J(k),\ddot{\theta}_J(k)]$$

and a frequency spectrum corresponding to the operational state $$[D(1,k),D(2,k),\ldots,D(F,k)]$$

are stored in the template database 205.

In step S1040 of FIG. 4, it is determined whether or not a sufficient number of templates have been stored in the template database 205. If affirmative, the process will be terminated. Otherwise, the process return to step S1010.

Feature vectors representing operational states and frequency spectra of acoustic data are time-tagged. Accordingly, templates can be generated by combining a feature vector and a frequency spectrum whose time tags agree with each other. The template database shown in FIG. 3 is generated as a set of templates which have been thus generated.

Figure 5:
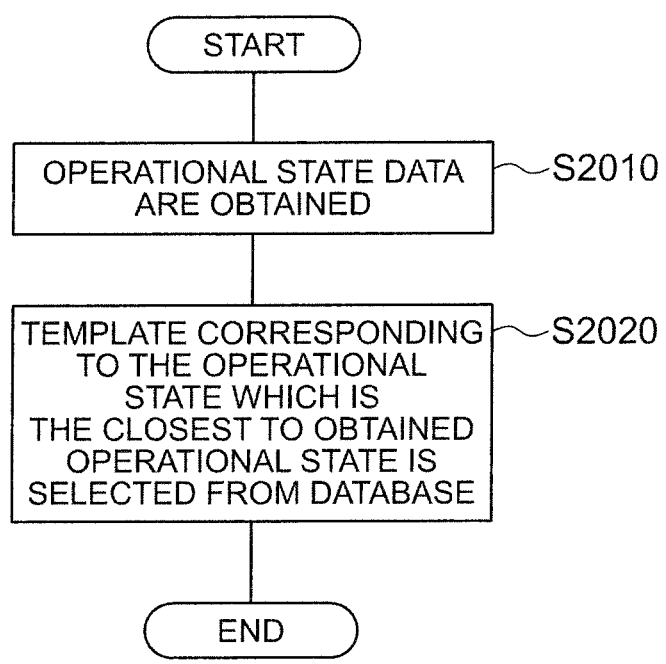
FIG. 5 is a flowchart showing a process of noise prediction.

FIG. 5 is a flowchart showing a process of noise prediction.

In step S2010 of FIG. 5, the operational state detecting section 101 obtains an operational state (a feature vector) of the robot.

In step S2020 of FIG. 5, the noise template selecting section 203 receives the obtained operational state (the feature vector) from the operational state detecting section 101 and selects the template corresponding to the operational state which is the closest to the obtained operational state among the templates in the template database 205.

Assuming that the number of the joints of the robot is J, feature vectors of operational states correspond to points in a 3J-dimensional space. A feature vector of an operational state represented by an arbitrary template in the template database 205 is represented by $$\vec{s} = (s_1, s_2, \ldots, s_{3J})$$

while a feature vector of the obtained operational state is represented by $$\vec{q} = (q_1, q_2, \ldots, q_{3N}).$$

Then, selecting the template corresponding to the operational state which is the closest to the obtained operational state corresponds to obtaining the template having the feature vector $$\vec{s} = (s_1, s_2, \ldots, s_{3J})$$

which minimizes a distance $$d(\vec{q}, \vec{s}) = \|\vec{q} - \vec{s}\| = \sqrt{\sum_{i=1}^{3J}(q_i - s_i)^2} \quad (1)$$

in the 3J-dimensional Euclidian space.

The missing feature mask generating section 300 will be described below. A missing feature mask will be called a MFM hereinafter. The MFM generating section 300 includes a speaker MFM generating section 301, an ego noise MFM generating section 303 and a MFM integrating section 305 which integrates the both MFMs to generate a single MEM.

A missing feature theory automatic speech recognition (MFT-ASR) is a very promising Hidden Markov Model based speech recognition technique that basically applies a mask to decrease the contribution of unreliable parts of distorted speech (B. Raj and R. M. Stern, "Missing-feature approaches in speech recognition", IEEE Signal Processing Magazine, vol. 22, pp. 101-116, 2005.). By keeping the reliable parameters that are essential for speech recognition, a substantial increase in recognition accuracy is achieved.

The speaker MFM generating section 301 obtains a reliability against speaker separation artifacts (a separation reliability) and generates a speaker MFM based on the reliability. A separation reliability for a speaker is represented by the following expression, for example (S. Yamamoto, J. M. Valin, K. Nakadai, J. Rouat, F. Michaud, T. Ogata, and H. G. Okuno, "Enhanced Robot Speech Recognition Based on Microphone Array Source Separation and Missing Feature Theory", IEEE/RSJ International Conference on Robotics and Automation (ICRA), 2005).

$$m_m(f, k) = \frac{\hat{S}_{out}(f, k) + \hat{B}(f, k)}{\hat{S}_{in}(f, k)} \quad (2)$$

$\hat{S}_{in}$ and $\hat{S}_{out}$ are respectively the post-filter input and output energy estimates of the speech enhancing section 105 for time-series frame k and Mel-frequency band f. $\hat{B}(f, k)$ denotes the background noise estimate and $m_m(f, k)$ gives a measure for the reliability. The input energy estimate $\hat{S}_{in}$ of the speech enhancing section 105 is a sum of $\hat{S}_{out}$ and the background noise estimate $\hat{B}(f, k)$ and a leak energy estimate. So, the reliability of separation of speakers becomes 1 when there exists no leak (when a speech is completely separated without blending of any other sounds from other sources) and the reliability of separation of speakers approaches 0 as the leak becomes larger. The reliability of separation of speakers is obtained for each sound source, each time-series frame k and each Mel-frequency band f. Generation of a speaker MFM based on the reliability of separation of speakers thus obtained will be described later.

The ego noise MFM generating section 303 obtains a reliability of ego noise and generates an ego noise MFM based on the reliability. It is assumed that ego noise, that is, motor noise of the robot is distributed uniformly among the existing sound sources. Accordingly, noise energy for a sound source is obtained by dividing the whole energy by the number of the sound sources (the number of the speakers). The reliability for ego noise can be represented by the following expression.

$$m_e(f, k) = 1 - \min\left(1, \frac{\hat{S}_e(f, k)}{l \cdot S_{out}(f, k)}\right) \quad (3)$$

$\hat{S}_e(f, k)$ is the noise template, that is, the noise energy estimate and l represents the number of speakers. To make $m_e(f, k)$ and $m_m(f, k)$ value ranges consistent, the possible values that it can take are limited between 0 and 1. According to Expression (3), if high motor noise $\hat{S}_e(f, k)$ is estimated, the reliability is zero, whereas low motor noise sets $m_e(f, k)$ close to 1. The reliability of ego noise is obtained for each sound source, each time-series frame k and each Mel-frequency band f.

Generation of the speaker MFM based on the reliability of separation of speakers and generation of the ego noise MFM based on the reliability for ego noise will be described below. Masks can be grouped into hard masks which take a value of wither 0 or 1 and soft masks which take any value between 0 and 1 inclusive. The hard mask (hard MFM) can be represented by the following expression. x means m which represents a reliability of separation of speakers $m_m(f, k)$ or a mask for a speaker $M_m(f, k)$ or e which represents a reliability for ego noise $m_e(f, k)$ or a mask for the ego noise $M_e(f, k)$.

$$M_x(f,k)=1 \text{ if } m_x(f,k) \geq T_x$$

$$M_x(f,k)=0 \text{ if } m_x(f,k) < T_x \quad (4)$$

The soft mask (soft MFM) can be represented by the following expression.

$$M_x(f, k) = \frac{1}{1 + \exp(-\sigma_x(m_x(f, k) - T_x))} \text{ if } m_x(f, k) \geq T_x \quad (5)$$

$$M_x(f, k) = 0 \qquad \text{if } m_x(f, k) < T_x$$

$\sigma_x$ is the tilt value of a sigmoid weighting function and $T_x$ is a predefined threshold. A speech feature is considered unreliable, if the reliability measure is below a threshold value $T_x$.

Further, a concept called minimum energy criterion (mec) is introduced. If the energy of the noisy signal is smaller than a given threshold $T_{mec}$, the mask is determined by the following expression.

$$M_x(f,k)=0 \text{ if } \hat{S}_{out}(f,k)<T_{mec} \quad (6)$$

The minimum energy criterion is used to avoid wrong estimations caused by computations performed with very low-energy signals, e.g. during pauses or silent moments.

The MFM integrating section 305 integrates a speaker MFM and an ego noise MFM to generate a total MFM. As described above, the speaker MFM and the ego noise MFM serve different purposes. Nevertheless, they can be used in a complementary fashion within the context of multi-speaker speech recognition under ego-motion noise. The total mask can be represented by the following expression.

$$M_{tot}(f,k)=w_m M_m(f,k) \dotplus w_e M_e(f,k) \quad (7)$$

$M_{tot}(f, k)$ is the total mask and $w_x$ is the weight of the corresponding mask. $\dotplus$ denotes any way of integration including AND operation and OR operation.

Explanation of the flowchart of FIG. 2 will be described below.

In step S0010 of FIG. 2, the sound source separating and speech enhancing section 100 separates sound sources.

In step S0020 of FIG. 2, the ego noise predicting section 200 predicts ego noise. (That is, an ego noise estimate is obtained.)

In step S0030 of FIG. 2, the speaker MFM generating section 301 generates speaker MFMs for each individual speaker (sound source).

In step S0040 of FIG. 2, the ego noise MFM generating section 303 generates ego noise MFMs for each individual speaker (sound source).

In step S0050 of FIG. 2, the total MFM generating section 305 generates total MFMs for each individual speaker (sound source).

In step S0060 of FIG. 2, the acoustic feature extracting section 401 extracts acoustic feature of each individual speaker (sound source).

In step S0070 of FIG. 2, the speech recognizing section 501 performs speech recognition using the acoustic feature of each individual speaker (sound source) and the total MFMs for each individual speaker (sound source).

Experiments

Experiments for checking performance of the speech recognition system will be described below.

1) Experimental Settings

A humanoid robot is used for the experiments. The robot is equipped with an 8-ch microphone array on top of its head. Of the robots many degrees of freedom, only a vertical head motion (tilt), and 4 motors for the motion of each arm with altogether 9 degrees of freedom were used Random motions performed by the given set of limbs were recorded by storing a training database of 30 minutes and a test database 10 minutes long. Because the noise recordings are comparatively longer than the utterances used in the isolated word recognition, those segments, in which all joints contribute to the noise were selected. After normalizing the energies of the utterances to yield an SNR of −6 dB (noise: two other interfering speakers), the noise signal consisting of ego noise (including ego-motion noise and fan noise) and environmental background noise is mixed with clean speech utterances. This Japanese word dataset includes 236 words for 1 female and 2 male speakers that are used in a typical humanoid robot interaction dialog. Acoustic models are trained with Japanese Newspaper Article Sentences (JNAS) corpus, 60-hour of speech data spoken by 306 male and female speakers, hence the speech recognition is a word-open test. 13 static MSLS (Mel-scale logarithmic spectrum), 13 delta MSLS and 1 delta power were used as acoustic features. Speech recognition results are given as average Word Correct Rates (WCR).

Figure 6:
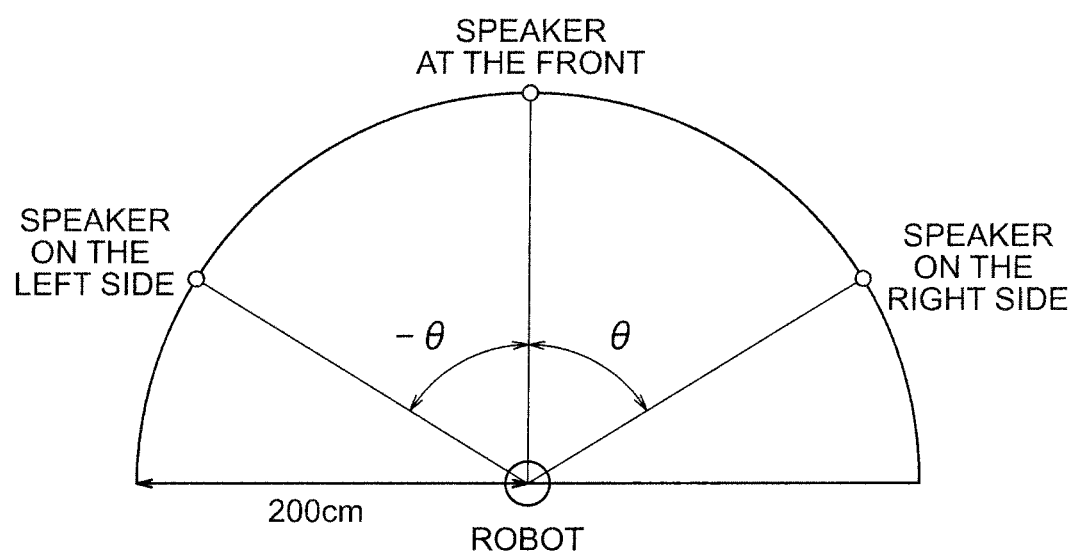
FIG. 6 shows positions of the robot and the speakers.

FIG. 6 shows positions of the robot and the speakers. The position of the speakers were kept fixed at three position configurations throughout the experiments: wide separation intervals [−80°, 0°, 80°] and narrow separation intervals [−20°, 0°, 20°]. To avoid the mis-recognition due to localization errors and evaluate the performance of the proposed method, the locations were set manually by by-passing SSL (Sound Source Localizing) module. The recording environment was a room with the dimensions of 4.0 m×7.0 m×3.0 m with a reverberation time of 0.2 s.

MFMs with the following heuristically selected parameters Te=0, Te=0.2, $\sigma_e$=2, $\sigma_m$=0.003 (energy interval:[0 1]) were evaluated.

2) Results of the Experiments

Figure 7:
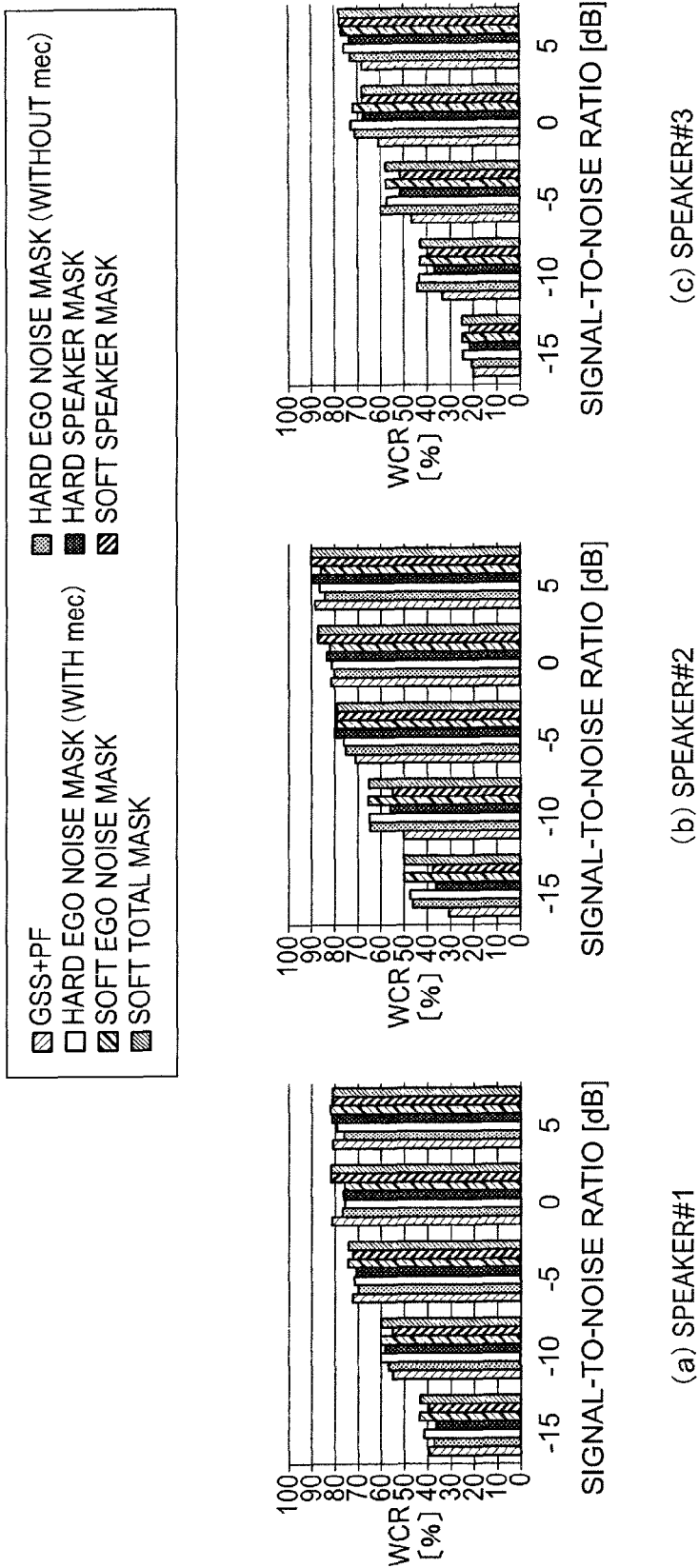
FIG. 7 illustrates the ASR accuracies for a speaker setting with a wide separation interval and for all methods under consideration.
Figure 8:
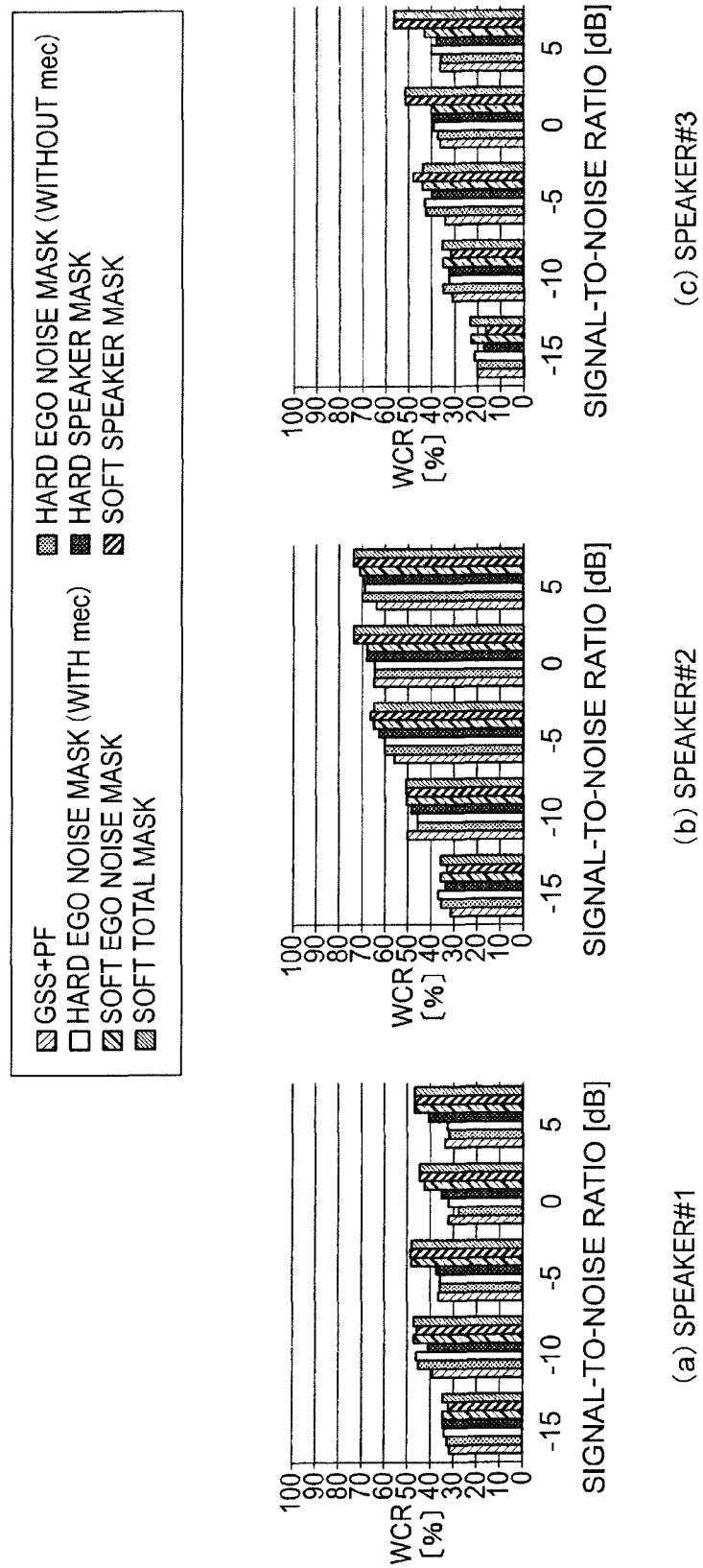
FIG. 8 illustrates the ASR accuracies for a speaker setting with a narrow separation interval and for all methods under consideration.

FIGS. 7 and 8 illustrate the ASR accuracies for a speaker setting with a wide separation interval and for a speaker setting with a narrow separation interval, respectively and for all methods under consideration. In all the graphs of FIGS. 7 and 8, the horizontal axis represents signal to noise ratio (in unit of dB) while the vertical axis represents WCR (Word Correct Rate, in unit of %). Because the task is a multi-speaker recognition, GSS+PF (sound source separation and speech enhancement) is considered as the baseline. The methods include sound source separation and speech enhancement (without a MFM), sound source separation and speech enhancement with hard ego noise MFMs (without mec), those with hard ego noise MFMs (with mec), those with hard speaker MFMs, those with soft ego noise MFMs, those with soft speaker MFMs and those with soft total MFMs. There is only little improvement gained from minimum energy criterion (mec), as the results of the comparison for the hard masks presents in both figures. In overall it contributes only up to 1-3% to WCR. General trends are below.

1) Soft masks outperform hard masks for almost every condition. This improvement is attained due to the improved probabilistic representation of the reliability of each feature.

2) The ego noise masks perform well for low SNRs (Signal to Noise Ratio), however WCRs deteriorate for high SNRs. The reason resides in the fact that faulty predictions of ego-motion noise degrade the quality of the mask, thus ASR accuracy, of clean speech more compared to that of noisy speech. On the other hands, in high SNRs (inferring no robotic motion or very loud speech) multi-speaker masks improve the outcomes significantly, but their contribution suffers in lower SNRs instead.

3) As the separation interval gets narrower, the WCRs tend to reduce drastically. A slight increase in the accuracy provided by speaker masks $M_m$ compared to ego noise masks $M_e$ in −5 dB for narrow separation angles was observed. The reason is that the artifacts caused by sound source separation for very close speakers become very dominant.

Based on the assessment of trend 1) and 2) described above, in Expression (7) representing total masks, soft masks are adopted as speaker masks $M_m$ and ego noise masks $M_e$, and weights $w_x$ are determined by the following expression.

$$\{w_e, w_m\}=\{1,0\} \text{ if SNR}<0$$

$$\{w_e, w_m\}=\{0,1\} \text{ if SNR}\geq 0 \quad (8)$$

SNR represents signal to nose ratio. A signal to noise ratio is set for each speaker to a ratio of an output of the speech enhancing segment 105 to a quotient obtained by dividing an output of the ego noise predicting section 200 by the number of the speakers.

On the other hand, a WCR of total masks adopting AND or OR-based integration was inferior to the superior one between a WCR of speaker masks $M_m$ and that of ego noise masks $M_e$.

What is claimed is:

1. A speech recognition system comprising:
   a sound source separating and speech enhancing section;
   an ego noise predicting section;
   a missing feature mask generating section for generating missing feature masks using outputs of the sound source separating and speech enhancing section and the ego noise predicting section;
   an acoustic feature extracting section for extracting an acoustic feature of each sound source using an output for said each sound source of the sound source separating and speech enhancing section; and
   a speech recognizing section for performing speech recognition using outputs of the acoustic feature extracting section and the missing feature masks.

2. A speech recognition system comprising:
   a sound source separating and speech enhancing section;
   an ego noise predicting section;
   a speaker missing feature mask generating section for generating speaker missing feature masks for each sound source using an output for said each sound source of the sound source separating and speech enhancing section;
   an ego noise missing feature mask generating section for generating ego noise missing feature masks for each sound source using an output for said each sound source of the sound source separating and speech enhancing section and an output of the ego noise predicting section;
   a missing feature mask integrating section for integrating speaker missing feature masks and ego noise missing feature masks to generate total missing feature masks;
   an acoustic feature extracting section for extracting an acoustic feature of each sound source using an output for said each sound source of the sound source separating and speech enhancing section; and
   a speech recognizing section for performing speech recognition using outputs of the acoustic feature extracting section and the total missing feature masks.

3. A speech recognition system according to claim 2, wherein the ego noise missing feature mask generating section generates the ego noise missing feature masks for each sound source using a ratio between a value obtained by dividing the output of the ego noise predicting section by the number of the sound sources and an output for said each sound source of the sound source separating and speech enhancing section.

4. A speech recognition system according to claim 2, wherein the missing feature mask integrating section adopts a speaker missing feature mask as a total missing feature mask for each sound source when an output for said each sound source of the sound source separating and speech enhancing section is equal to or greater than a value obtained by dividing the output of the ego noise predicting section by the number of the sound sources and adopts an ego noise missing feature mask as the total missing feature mask for said each sound source when the output for said each sound source of the sound source separating and speech enhancing section is smaller than the value obtained by dividing the output of the ego noise predicting section by the number of the sound sources.

5. A speech recognizing method comprising the steps of:
   separating sound sources by a sound source separating and speech enhancing section;
   predicting ego noise by an ego noise predicting section;
   generating missing feature masks using outputs of the sound source separating and speech enhancing section and an output of the ego noise predicting section, by a missing feature mask generating section;
   extracting acoustic an acoustic feature of each sound source using an output for said each sound source of the sound source separating and speech enhancing section, by an acoustic feature extracting section; and
   performing speech recognition using outputs of the acoustic feature extracting section and the missing feature masks, by a speech recognizing section.

6. A speech recognizing method comprising the steps of:
   separating sound sources by a sound source separating and speech enhancing section;
   predicting ego noise by an ego noise predicting section;
   generating speaker missing feature masks for each sound source using an output for said each sound source of the sound source separating and speech enhancing section, by a speaker missing feature mask generating section;
   generating ego noise missing feature masks for each sound source using an output for said each sound source of the sound source separating and speech enhancing section and an output of the ego noise predicting section, by an ego noise missing feature mask generating section;
   integrating speaker missing feature masks and ego noise missing feature masks to generate total missing feature masks, by a missing feature mask integrating section;
   extracting an acoustic feature of each sound source using an output for said each sound source of the sound source separating and speech enhancing section, by an acoustic feature extracting section; and
   performing speech recognition using outputs of the acoustic feature extracting section and the total missing feature masks, by a speech recognizing section.

7. A speech recognizing method according to claim 6, wherein in the step of generating ego noise missing feature masks, the ego noise missing feature masks for each sound source are generated using a ratio between a value obtained by dividing the output of the ego noise predicting section by the number of the sound sources and an output for said each sound source of the sound source separating and speech enhancing section.

8. A speech recognizing method according to claim 6, wherein in the step of integrating speaker missing feature masks and ego noise missing feature masks to generate total missing feature masks, a speaker missing feature mask is adopted as a total missing feature mask for each sound source when an output for said each sound source of the sound source separating and speech enhancing section is equal to or greater than a value obtained by dividing the output of the ego noise predicting section by the number of the sound sources and an ego noise missing feature mask is adopted as the total missing feature mask for said each sound source when the output for said each sound source of the sound source separating and speech enhancing section is smaller than the value obtained by dividing the output of the ego noise predicting section by the number of the sound sources.

* * * * *